United States Patent [19]
Parker et al.

[11] Patent Number: 5,895,115
[45] Date of Patent: Apr. 20, 1999

[54] LIGHT EMITTING PANEL ASSEMBLIES FOR USE IN AUTOMOTIVE APPLICATIONS AND THE LIKE

[75] Inventors: Jeffery R. Parker, Strongsville; Mark D. Miller, Parma; Thomas A. Hough, Lakewood, all of Ohio

[73] Assignee: Lumitex, Inc., Strongsville, Ohio

[21] Appl. No.: 08/585,062

[22] Filed: Jan. 16, 1996

[51] Int. Cl.$^6$ .................................................. B60Q 1/26
[52] U.S. Cl. ........................ 362/511; 362/31; 362/320; 362/496; 362/543; 362/244
[58] Field of Search ................................ 362/26, 27, 31, 362/32, 235, 244, 278, 320, 459, 487, 496, 511, 543, 544, 545

[56] References Cited

U.S. PATENT DOCUMENTS

| | | | |
|---|---|---|---|
| 3,328,570 | 6/1967 | Balchunas | 362/31 |
| 3,739,512 | 6/1973 | Ruppert | 40/546 |
| 3,819,928 | 6/1974 | Kuroyama et al. | 200/313 |
| 3,892,959 | 7/1975 | Pulles | 362/31 |
| 4,257,084 | 3/1981 | Reynolds | 362/31 |
| 4,321,655 | 3/1982 | Bouvrande | 362/29 |
| 4,446,508 | 5/1984 | Kinzie | 362/31 |
| 4,573,766 | 3/1986 | Bournay et al. | 349/65 |
| 4,630,895 | 12/1986 | Abdala et al. | 349/65 |
| 4,710,602 | 12/1987 | Baity et al. | 200/315 |
| 4,714,983 | 12/1987 | Lang | 362/27 |
| 4,729,185 | 3/1988 | Baba | 362/31 |
| 4,751,615 | 6/1988 | Abrams | 362/31 |
| 4,778,966 | 10/1988 | Obata et al. | 200/314 |
| 4,789,224 | 12/1988 | Bouzsty | 349/65 |
| 4,792,884 | 12/1988 | Sumar et al. | 362/135 |
| 4,816,968 | 3/1989 | Yamada et al. | 362/80 |
| 4,851,624 | 7/1989 | Chestnut et al. | 200/317 |
| 4,897,771 | 1/1990 | Parker | 362/298 |
| 4,974,122 | 11/1990 | Shaw | 362/31 |
| 4,975,808 | 12/1990 | Bond et al. | 362/31 |
| 4,977,487 | 12/1990 | Okano | 362/32 |
| 4,978,952 | 12/1990 | Irwin | 345/102 |
| 5,005,108 | 4/1991 | Pristash et al. | 362/31 |
| 5,040,098 | 8/1991 | Tanaka et al. | 362/31 |
| 5,070,431 | 12/1991 | Kitazawa et al. | 362/31 |
| 5,095,409 | 3/1992 | Dematteo et al. | 362/23 |
| 5,136,483 | 8/1992 | Schöniger et al. | 362/61 |
| 5,142,453 | 8/1992 | Ohta et al. | 362/29 |
| 5,146,057 | 9/1992 | Hellebuyck et al. | 200/313 |
| 5,198,283 | 3/1993 | Hausler et al. | 428/195 |
| 5,203,226 | 4/1993 | Hongou et al. | 74/552 |
| 5,227,773 | 7/1993 | Wu et al. | 362/31 |
| 5,359,165 | 10/1994 | Leveque et al. | 200/317 |
| 5,365,412 | 11/1994 | Koppolu et al. | 362/32 |
| 5,386,090 | 1/1995 | Hofmann | 200/308 |
| 5,434,754 | 7/1995 | Li et al. | 362/31 |
| 5,436,808 | 7/1995 | Noponen | 362/61 |
| 5,590,945 | 1/1997 | Simms | 362/31 |
| 5,711,592 | 1/1998 | Hotta | 362/80 |

*Primary Examiner*—Alan Cariaso
*Attorney, Agent, or Firm*—Renner, Otto, Boisselle & Sklar, P.L.L.

[57] ABSTRACT

Light emitting panel assemblies include in one form of the invention a light emitting panel member made of a transparent resiliently deformable elastomeric material that absorbs impact without breakage for use in automotive lighting applications of various types. In another form of the invention, a rigid light emitting panel member may be used with dome switches for switch area lighting or to backlight control buttons/key pads by providing holes or openings in the panel member for the control buttons/key pads. Also, a rigid light emitting panel member may be used as a structural member, and two or more such light emitting panel members may be stacked together and used to light an instrument panel or the like. One or more light sources may be mounted within one or more light transition areas adjacent one or more light input surfaces of the light emitting panel members. Also one or more light sources may be positioned adjacent one side of the light emitting panel members for causing light to shine through the panel members or through holes in the panel members for performing specified lighting functions.

16 Claims, 5 Drawing Sheets

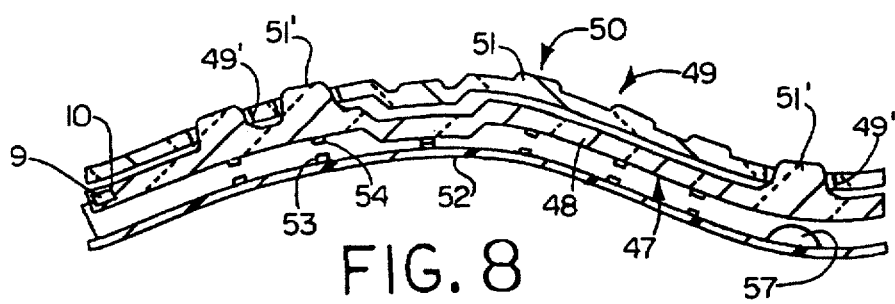
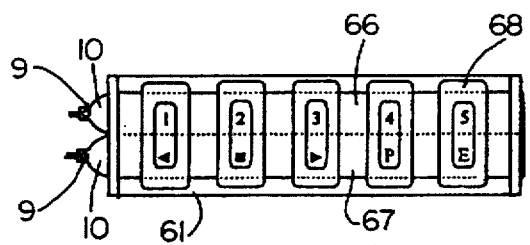
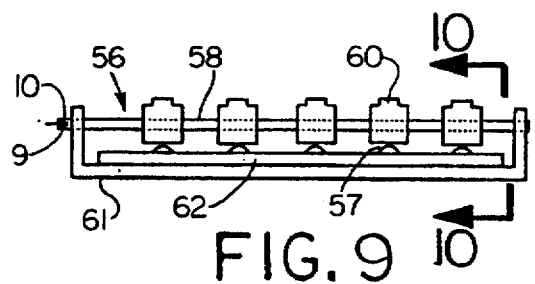
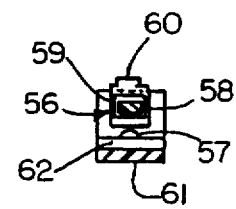
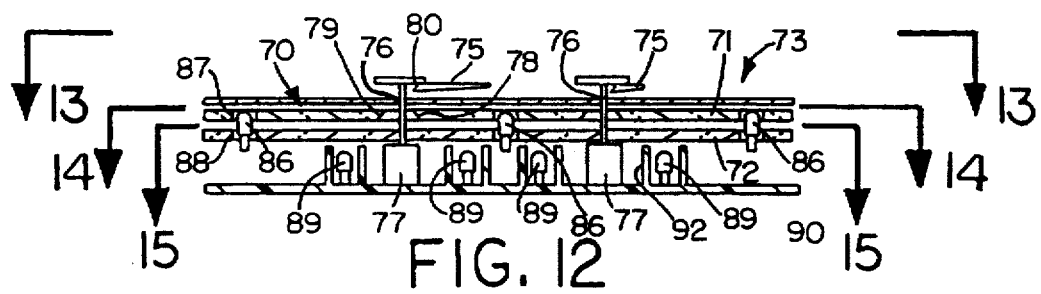
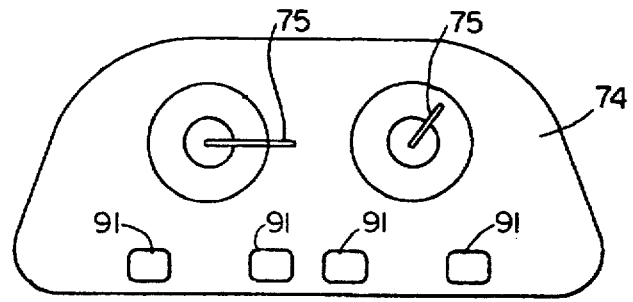

LIGHT EMITTING PANEL ASSEMBLIES FOR USE IN AUTOMOTIVE APPLICATIONS AND THE LIKE

FIELD OF THE INVENTION

This invention relates generally as indicated to light emitting panel assemblies especially for automotive applications.

BACKGROUND OF THE INVENTION

Light emitting panel assemblies are generally known. The present invention relates to certain improvements in light emitting panel assemblies especially for automotive applications. Also, this invention is concerned with passing/shining light directly through a light emitting panel member or through holes in the panel member for performing specified lighting functions, for example, providing brake or turn signal lights and/or turning or backup illumination for a vehicle.

SUMMARY OF THE INVENTION

In accordance with one aspect of the invention, the light emitting panel assemblies of the present invention may include a light emitting panel member made out of a suitable transparent resiliently deformable elastomeric material that absorbs impact without breakage. Such panel members are especially suitable for use both in interior automotive lighting applications to reduce the possibility of serious injury to a driver or passenger of a vehicle when thrown into contact with the panel member during a traffic accident, and in exterior automotive lighting applications to help eliminate damage to the panel member if impacted during a traffic accident.

Examples where such a resiliently deformable light emitting panel member may be effectively used in interior automotive lighting applications to reduce injury during accidents are steering wheel and dash lighting applications for lighting controls, switches, instrument panels, headliner lighting, logos and/or accent lighting.

In steering wheel applications, a resiliently deformable light emitting panel member may be mounted in the hub portion of the steering wheel outwardly of an air bag for lighting controls and/or switches or logos on the steering wheel hub and for accent lighting.

When used on a dash or other flush mount applications such as instrument panels and headliner lighting, a resiliently deformable panel member will absorb impact/shock, and may be contoured to match the shape of the dash or other surface.

Examples where such a resiliently deformable panel member may be effectively used in exterior automotive lighting applications to reduce or eliminate damage to the panel member during accidents are running or accent lights in the bumper or other exterior body portions of a vehicle. The light emitting panel member may also be incorporated into a trunk lid of a vehicle to provide running lights and/or license plate or logo illumination in the trunk lid. In applications where the trunk lid is recessed, the panel member may be rigid. However, if the trunk lid is substantially flush with the body exterior, the panel member is desirably resiliently deformable to withstand impacts during accidents without breakage of the panel member.

In accordance with another aspect of the invention, one or more light sources may be mounted within one or more light transition areas or regions adjacent one or more light input surfaces of a light emitting panel member.

In accordance with another aspect of the invention, one or more light sources may be positioned adjacent one side of the panel member for causing light to shine through the panel member or through holes in the panel member for performing specified lighting functions, for example, providing brake or turn signal lights and/or turning or backup illumination for a vehicle.

In accordance with another aspect of the invention, one or more light sources may be selectively positioned along an edge or side of the panel member for increasing the light output from selected light output areas/regions on one or both sides of the panel member.

In accordance with another aspect of the invention, a resiliently deformable light emitting panel member may be used to backlight a liquid crystal display (LCD) and/or multiple control switches or key pads of a radio or other electrical device. Such a panel member upon being engaged by a control button/key pad will be deformed into electrical contact with a switch or other circuitry such as a printed circuit inwardly of the panel member for performing a selected switching function.

In accordance with another aspect of the invention, a rigid light emitting panel member may be used to backlight an LCD and/or multiple control buttons/key pads of a radio or other electrical device by providing holes or openings through the panel member for movement of a portion of the control buttons/key pads into and out of electrical contact with a printed circuit inwardly of the panel member. Surface irregularities such as print patterns or molded in shapes may be provided on the panel surfaces around the holes/openings to flood the areas around the buttons/key pads with light.

In accordance with another aspect of the invention, a rigid light emitting panel member may be used with dome and other such switches for switch area lighting. One or more such rigid light emitting panel members each with its own separate light source and transition region may support a series of push buttons that float on the panel members to permit the push buttons to be moved into contact with the dome switches.

In accordance with another aspect of the invention, two or more stacked light emitting panel members may be used to light an instrument panel or the like. One of the panel members may be used to provide general backlighting for graphic displays on the instrument panel, whereas an other panel member may be used to light dial pointers or other elements on the instrument panel. Common or separate light sources may be used to supply light to input surfaces of two or more panel members. Also, separate indicator lights may be provided behind the panel members for providing through illumination to indicators on the graphic displays of the instrument panel.

In accordance with another aspect of the invention, a rigid light emitting panel member may be used as a structural member for graphic overlays or decals, to provide for example lighting for designating the gear shift lever positions of a vehicle. One or more light sources may be inserted/embedded within light transition regions at one or more locations along the length of the panel member to direct light into input surfaces of the panel member. Indicator lights may be provided adjacent an edge or side of the panel member in line with each indicator position for providing increased light output at the selected position. Also, a movable color filter may be provided between the panel member and label to provide a different colored light output at any selected gear shift position. For example, a movable red filter may be used to change the color of the light output at the selected gear shift lever position from white to red.

In accordance with another aspect of the invention, the light emitting panel member may have a secondary reflective/refractive surface for reflecting/refracting a portion of the light entering an input surface of the panel member around a corner of the panel member.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 8 is a schematic fragmentary section through a contoured surface such as the dash of a vehicle showing other forms of light emitting panel assemblies in accordance with this invention interposed between a printed circuit and a series of key pads either molded into the contoured surface or extending through openings therein;

FIG. 9 is a schematic side elevation view of another form of light emitting panel assembly in accordance with this invention used for supporting and illuminating a series of floating push buttons above a series of dome switches;

FIG. 10 is a transverse section through the assembly of FIG. 9 taken on the plane of the line 10—10 thereof;

FIG. 11 is a top plan view of another form of light emitting panel assembly in accordance with this invention which is also used to support and illuminate a series of floating push buttons;

FIG. 12 is a schematic vertical section through an instrument panel incorporating other forms of light emitting panel assemblies in accordance with this invention;

FIG. 13 is a top plan view of a graphic overlay for the instrument panel of FIG. 12 as seen from the plane of the line 13—13 thereof;

FIGS. 20 through 22 are schematic illustrations showing light emitting panel assemblies in accordance with this invention used to provide lighting for vanity mirrors and the like.

DETAILED DESCRIPTION OF THE PREFERRED EMBODIMENTS

Figure 1:
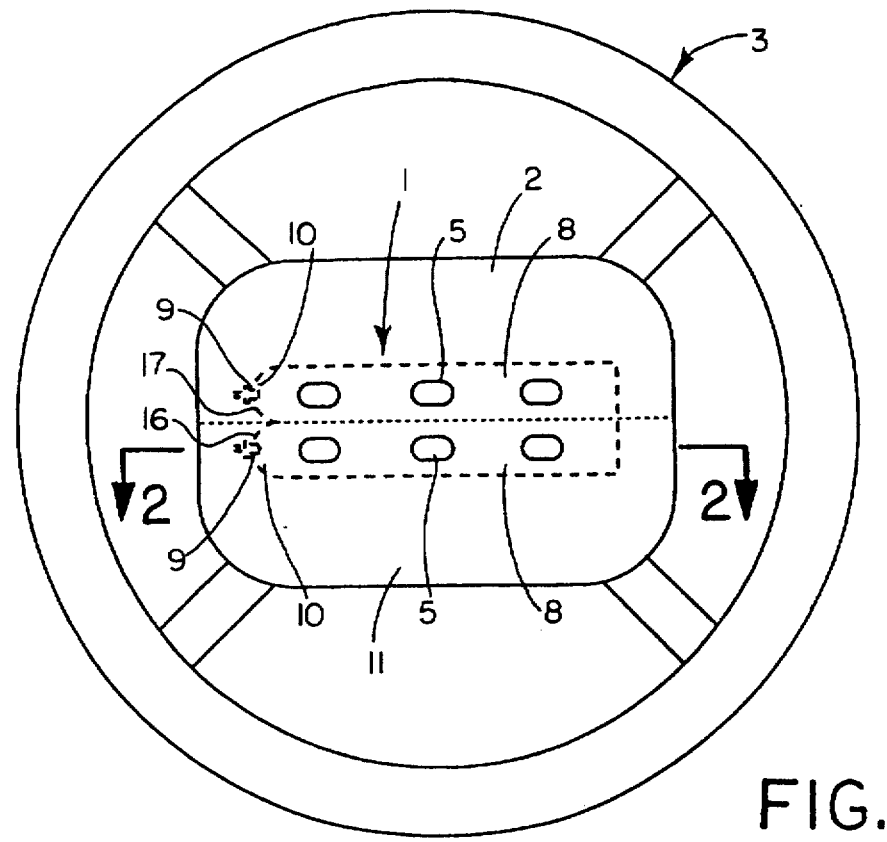
FIG. 1 is a schematic top plan view of a steering wheel of a vehicle incorporating one form of light emitting panel assembly in accordance with this invention in the hub portion of the steering wheel.
Figure 2:
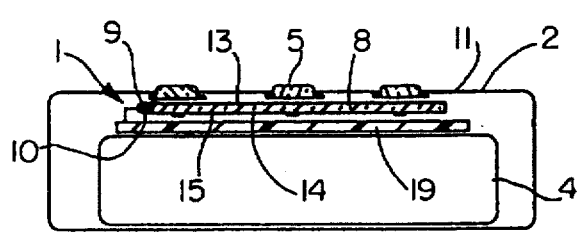
FIG. 2 is a fragmentary transverse section through the panel assembly within the hub portion of FIG. 1 taken on the plane of the line 2—2 thereof.

Referring now in detail to the drawings, and initially to FIGS. 1 and 2, there is schematically shown one form of light emitting panel assembly 1 in accordance with this invention mounted in the hub portion 2 of a steering wheel 3 of a vehicle outwardly of an air bag 4 to provide backlighting for control switches/buttons 5, the horn, logos, or other accent lighting on the steering wheel.

The light emitting panel assembly 1 includes a transparent light emitting panel member 8 having one or more light sources 9 mounted within one or more light transition areas or regions 10 at one or both ends of the panel member mounted within the air bag/steering wheel covering 11 outwardly of the air bag 4. In FIGS. 1 and 2, two such light transition areas or regions 10 and light sources 9 are shown at one end of one or two panel members 8 for selectively lighting one or two rows of control buttons 5. The light that enters the transparent light emitting panel members 8 from the light transition region(s) 10 may be emitted along the entire length of the panel members or from one or more light output surface areas along their length as desired to produce a desired light output distribution to fit a particular application.

The light sources 9 may be mechanically held in any suitable manner in slots, cavities or openings machined, molded or otherwise formed in the light transition regions of the panel assemblies. However, the light sources may be embedded, potted or bonded in the light transition regions in order to eliminate any air gaps or air interface surfaces between the light sources and surrounding light transition regions, thereby reducing light loss and increasing the light output emitted by the light emitting panels. Bonding may be accomplished using a suitable embedding, potting or bonding material or by a variety of methods that do not incorporate extra material, for example, thermal bonding, heat staking, ultrasonic or plastic welding or the like. Other methods of bonding include insert molding and casting around the light sources.

The light sources may be of any suitable type including, for example, any of the types disclosed in U.S. Pat. Nos.

4,897,771 and 5,005,108, assigned to the same assignee as the present application, the entire disclosures of which are incorporated herein by reference. In particular, the light sources may be non-linear such as an arc lamp, an incandescent bulb which also may be colored, filtered or painted, a lens end bulb, a halogen lamp, a light emitting diode (LED), a chip from an LED, a neon bulb, a fiber optic light pipe transmitting light from a remote light source, a laser or laser diode, or linear such as a line light or fluorescent tube, or any other suitable light source. Also, the light sources may be a multiple colored LED, or a combination of multiple colored radiation sources in order to provide a desired colored or white light output distribution. For example, a plurality of colored lights such as LEDs of different colors (red, blue, green) or a single LED with multiple colored chips may be employed to create white output in other color or shade light output distribution by varying the intensities of each individual colored light. A label/overlay with different color light emitting regions can be used in conjunction with a panel assembly having a plurality of colored light sources for specific indication based on color or the frequency of light emitted by the different light emitting regions.

Figure 2A:
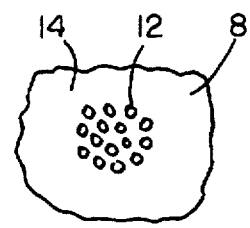
FIG. 2A is an enlarged plan view of a portion of a light output surface area of a panel assembly schematically showing a pattern of light extracting deformities on the light output surface area.

A pattern of light extracting deformities or disruptions 12 (see FIG. 2A) may be provided on one or both sides 13, 14 of the panel members along the entire length thereof or at one or more selected areas of the panel members as desired. The terms deformities or disruptions are used interchangeably herein to mean any change in the shape or geometry of the panel surface and/or coating or surface treatment that causes a portion of the light to be emitted. A pattern of light extracting deformities may include a variable pattern which breaks up the light rays such that the internal angle of reflection of a portion of the light rays will be great enough to cause the light rays either to be emitted out of the panel members through the side or sides on which the light extraction deformities are provided or reflected back through the panel members and emitted out the other side.

Such deformities or disruptions can be produced in a variety of manners, for example, by providing a painted pattern, an etched pattern, a machined pattern, a printed pattern, a painted pattern, a hot stamped pattern, or a molded pattern or the like at selected light output areas on the surfaces of the panel members. An ink or adhesive pattern or printed pattern may be applied for example by pad printing, silk screening, ink jet, photolithography, heat transfer film process or the like. The deformities may also be printed on a sheet or film which is used to apply the deformities to the sides of the panel members. This sheet or film may become a permanent part of the light panel assemblies for example by attaching or otherwise positioning the sheet or film against one or both sides of the panel members in order to produce a desired effect.

By varying the density, opaqueness or translucence, shape, depth, color, area, index of refraction, or type of deformities on an area or areas of the panel members, the light output of the panel members can be controlled. The deformities or disruptions may be used to control the percent of light emitted from any surface area of the panel members. For example, less and/or smaller size deformities may be placed on panel surface areas where less light output is wanted. Conversely, a greater percentage of and/or larger deformities may be placed on surface areas of the panels where greater light output is desired.

Varying the percentages and/or size of deformities in different surface areas of the panels is necessary in order to provide a uniform light output distribution. For example, the amount of light traveling through the panels will ordinarily be greater in areas closer to the light source than in other areas further removed from the light source. A pattern of light extracting deformities may be used to adjust for the light variances within the panel members, for example, by providing a denser concentration of light extracting deformities with increased distance from the light source thereby resulting in a more uniform light output distribution from the light emitting panels.

The deformities may also be used to control the output ray angle distribution of the emitted light to suit a particular application. For example, if the panel assemblies are used to provide a liquid crystal display backlight, the light output will be more efficient if the deformities cause the light rays to be emitted from the panels at predetermined ray angles such that they will pass through the liquid crystal display with low loss.

Additionally, the pattern of light extracting deformities may be used to adjust for light output variances attributed to light extractions of the panel members. The pattern of light extracting deformities may be printed on the light output surface areas utilizing a wide spectrum of paints, inks, coatings, epoxies, adhesives, or the like, ranging from glossy to opaque or both, and may employ half-tone separation techniques to vary the deformity coverage. If an adhesive is used to provide a pattern of light extracting deformities, the adhesive may also be used to secure a back reflector to the panel member. Moreover, the pattern of light extracting deformities may be multiple layers or vary in index of refraction.

Print patterns of light extracting deformities may vary in shapes such as dots, squares, diamonds, ellipses, stars, random shapes, and the like, and are desirably 0.006 square inch per deformity/element or less. Also, print patterns that are 60 lines per inch or finer are desirably employed, thus making the deformities or shapes in the print patterns nearly invisible to the human eye in a particular application thereby eliminating the detection of gradient or banding lines that are common to light extracting patterns utilizing larger elements. Additionally, the deformities may vary in shape and/or size along the length and/or width of the panel members. Also, a random placement pattern of the deformities may be utilized throughout the length and/or width of the panel members. The deformities may have shapes or a pattern with no specific angles to reduce moire or other interference effects. Examples of methods to create these random patterns are printing a pattern of shapes using stochastic print pattern techniques, frequency modulated half tone patterns, or random dot half tones. Moreover, the deformities may be colored in order to effect color correction in the panel members. The color of the deformities may also vary throughout the panel members, for example to provide different colors for the same or different light output surface areas.

In addition to or in lieu of these light extracting deformities, other light extracting deformities including prismatic surfaces, depressions or raised surfaces of various shapes using more complex shapes in a mold pattern may be molded, etched, stamped, thermoformed, hot stamped or the like into or on one or more surface areas of the panel members. The prismatic surfaces, depressions or raised surfaces will cause a portion of the light rays contacted thereby to be emitted from the panel members. Also, the angles of the prisms, depressions or other surfaces may be varied to direct the light in different directions to produce a desired light output distribution or effect. Moreover, the reflective or refractive surfaces may have shapes or a pattern with no specific angles to reduce moire or other interference effects.

A back reflector or reflective coating (including trans reflectors) 15 (see FIG. 2) may be applied to a bottom side of the panel members using a suitable adhesive or other method in order to improve light output efficiency of the panel assemblies by reflecting the light emitted from that side back through the panel members for emission through the opposite side. If adhesive is used to adhere the back reflector to the panel members, the adhesive is desirably applied only along the side edges of the panel members so that there is a slight air gap between the back reflector and panel members except where there is adhesive, since the adhesive changes the internal critical angle of the light in a less controllable manner than the air gap between the panel surface and back reflector.

Additionally, a pattern of light extracting deformities may be provided on one or both sides of the panel members in order to change the path of the light so that the internal critical angle is exceeded and a portion of the light is emitted from one or both sides of the panel members. Where the deformities are created by a print pattern, the back reflector can be the same color as the print pattern so that print pattern is not visible through the back reflector. Moreover, a transparent film, sheet or plate may be attached or positioned against the side or sides of the panel members from which light is emitted using a suitable adhesive or other method in order to produce a desired effect.

The transparent film may be used to further improve the uniformity of the light output distribution or change the output ray angle distribution. For example, the film may be a colored film, a diffuser, or a label or display, a portion of which may be a transparent overlay that may be colored and/or have text or an image thereon. Also the film may be a prismatic or lenticular lens or other device that changes the output ray angle distribution.

In FIG. 1 the light transition regions or areas 10 are shown as an integral extension of one end of the light emitting panel members 8 and as having curved edges 16 to more efficiently reflect and/or refract and focus the light emitted from the light sources that impinges on the curved edges 16 back through the light transition regions at an acceptable angle for entering the light input surface of the light emitting panel members. Also, a suitable reflective material or coating 17 may be provided on any portions of the edges of the light transition regions of the panel members on which any portion of the light impinges for maximizing the amount of light or otherwise changing the light that is reflected back through the light transition regions and into the light emitting panel members.

A suitable pattern of light extracting deformities or disruptions 12 may be provided on selected areas on one or both sides of the panel members 8 corresponding to the location of the control buttons 5 on the air bag covering 11 above the panel members. In the example shown, the pattern of light extracting deformities or depressions is provided on the bottom side 14 of the panel member 3 (i.e., the side facing away from the control buttons), and a reflective film or coating 15 is provided on that side to reflect the light emitted from that side back through the panel members.

Preferably the light emitting panel members 8 are made of a transparent resiliently deformable material such as a thermoplastic elastomer or silicone rubber which allows areas of the panel members in line with the control buttons to be flexed into engagement with a printed circuit 19 located beneath the panel members when the respective control buttons are depressed to complete an associated control circuit. Also if the air bag 4 should ever be deployed or if the driver's head should be forced into engagement with the hub portion 2 of the steering wheel 3 during a traffic accident, the resiliently deformable panel members 8 will absorb shock, thus greatly reducing the possibility of serious injury to the driver because of such contact.

The printed circuit 19 may be made of a suitable thermoplastic elastomer, silicone rubber or flexible film or laminated circuit or membrane or dome switch to absorb shock, thus further reducing the possibility of serious injury to the driver should the driver's head impact against the hub portion of the steering wheel or should the steering wheel air bag be deployed and force the panel members and circuit outwardly into contact with the driver.

Figure 3:
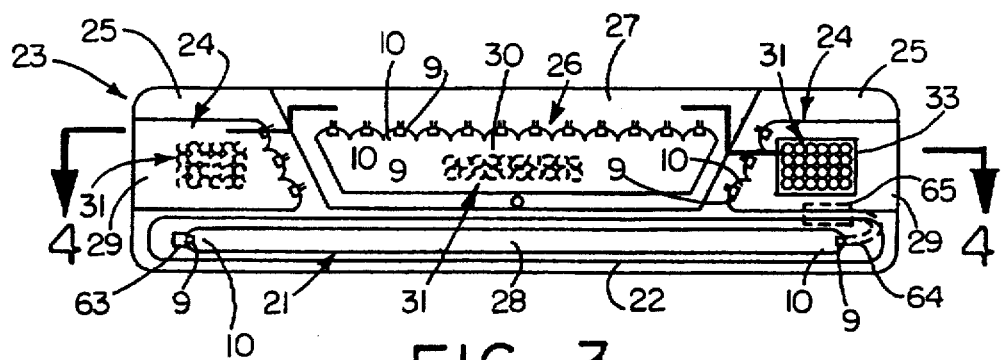
FIG. 3 is a schematic end view of a rear portion of a vehicle incorporating other forms of light emitting panel assemblies in accordance with this invention.
Figure 4:
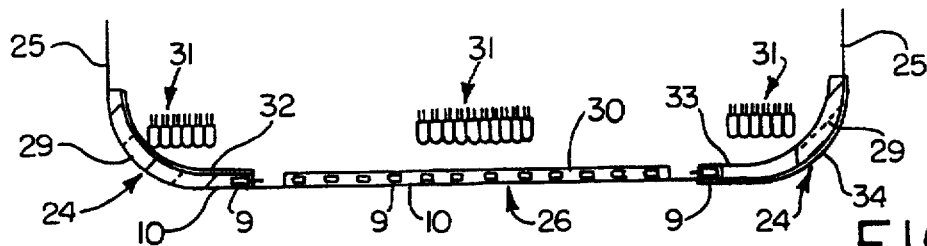
FIG. 4 is a fragmentary transverse section through the vehicle end portion and panel assemblies of FIG. 3 taken on the plane of the line 4—4 thereof.

Light emitting panel assemblies similar to that shown in FIGS. 1 and 2 may also be advantageously employed in other automotive applications as well such as the dash, instrument panel, headliner, and exterior lighting. FIGS. 3 and 4 show several automotive exterior lighting applications including one in which a light emitting panel assembly 21 is mounted in a back end or bumper 22 of a vehicle 23 to provide running lights in the back end/bumper, another in which light emitting panel assemblies 24 are mounted in body panels 25 along the rear, front and/or sides of a vehicle to provide running lights or accent lights or to light a logo, step, running board, or other surface area of a vehicle; and still another in which a light emitting panel assembly 26 is mounted in a vehicle trunk lid 27 for providing a running light or illumination for a logo, accent light or license plate mounted on the trunk lid. In each case the respective light emitting panel members 28, 29 and 30 are shaped to fit the particular application and may be made of a transparent resiliently deformable material such as a thermoplastic elastomer or silicone rubber that will flex upon impact during minor traffic accidents without breakage.

The number and location of light sources 9 and associated light transition regions 10 for a given light emitting panel member may vary for a given application depending on the overall size and shape of each panel member and desired amount of light output therefrom. For example, the back end/bumper running light application shown in FIGS. 3 and 4 may only require one light source 9 and associated light transition region 10 at each end of the panel member 28, whereas the body panel and trunk lid running light applications shown in FIGS. 3 and 4 may require a plurality of closely spaced light sources 9 and associated light transition regions 10 along one or more light input surfaces of the panel members. FIGS. 3 and 4 show several such light sources and associated light transition regions along the back edges of the panel members 29 used to provide running taillights for a vehicle and along a top edge of the panel member 30 used to provide illumination on a trunk lid. Mounting all of the light sources for the tail running lights along the back edges of the panel members 29 (i.e., the edges closest to the trunk lid) minimizes the risk that the light sources themselves will be damaged in the event the tail running lights are impacted during minor traffic accidents and the like. These panel members may have a relatively thin, low profile, for example, less than one quarter inch thick, so as not to take up much space. Also, these panel members 29 may form the exterior surface of the body panel 25 as shown at the left hand side of FIG. 4 or a lens or film 34 may cover the panel members as shown at the right hand side of FIG. 4.

In the usual case the light sources are embedded, potted or bonded in the light transition regions of the panels as previously described. However, FIG. 3 shows the light source 9 at the left end of panel member 28 mechanically held in place by a holder 63 received in a slot in an edge of the panel member. Also a fiber optic light pipe 64 is shown at the right end of the panel member 28 of FIG. 3 for transmitting light to the panel member from a remote light source 65 located for example in the trunk or other remote location in the vehicle.

An additional array of light sources 31 such as LEDs or incandescent or halogen lamps (with or without reflectors) may also be strategically mounted inwardly (i.e., behind) the inner surface of the light emitting panel members 29 and/or 30 to cause a more intense light to shine through the panel members and a trans reflector 32 if provided on the panel members or through one or more clear areas or holes 33 through the panel members where no print pattern, back reflector or trans reflector is provided on the panel members as also schematically shown in FIGS. 3 and 4 for specific applications, for example, to provide brake or turn signal lights, turning or backup illumination, etc. By locating the light sources 9 for illuminating the panel members 29 themselves adjacent one or more ends of the panel members, they will not interfere with or obstruct the visibility of the array of light sources 31 shining through the panel members.

In automotive applications such as a trunk lid 27 where the light emitting panel assembly 26 may be sufficiently recessed such that the light emitting panel member 30 will typically not be impacted during minor traffic accidents, the panel member could be made of a rigid transparent material such as polycarbonate or acrylic plastic instead of a resiliently deformable material if desired.

Figure 5:
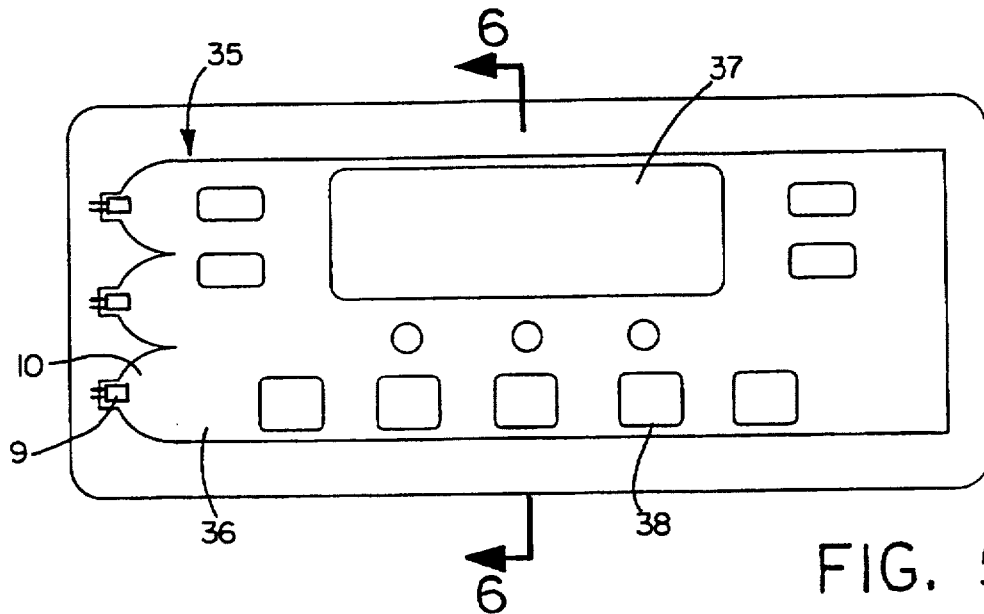
FIG. 5 is a schematic plan view of a radio or other electronic device incorporating another form of light emitting panel assembly in accordance with this invention.
Figure 6:
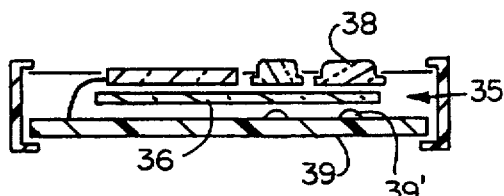
FIG. 6 is a transverse section through the assembly of FIG. 5 taken on the plane of the line 6–6 thereof.

FIGS. 5 and 6 schematically show another form of light emitting panel assembly 35 in accordance with this invention including a resiliently deformable transparent light emitting panel member 36 mounted behind an LCD 37 and/or multiple control buttons 38 of a radio or other device for illumination of the LCD and control buttons either by causing light to be uniformly emitted from the entire surface of the panel member or from specific surface areas of the panel member in the regions of the LCD and control buttons as desired. Any number of light sources 9 and associated light transition regions 10 may be provided for the panel member 36 as desired. Also, the panel member 36 is desirably made of a resiliently deformable elastomeric material so that when the control buttons 38, which may either be membrane switches or elastomeric key pads that are molded or embossed, are depressed into engagement with the panel member, the engaged areas of the panel member will flex into engagement with associated dome switches 39' or other circuitry on a printed circuit 39 beneath the panel member to effect the selected switching function.

Alternatively, a light emitting panel member 40 in accordance with this invention may be made of a relatively rigid transparent material such as polycarbonate or acrylic plastic, with through holes 41 in the panel member in alignment with membrane switches or elastomeric key pads 42 or other such control buttons (see FIG. 7) to permit contact portions 43 on the control buttons to engage appropriate circuitry on a printed circuit 44 inwardly of the panel member when the control buttons are depressed. Alternatively, the control buttons 42 may be used to activate dome switches (one such dome switch 57 being shown toward the right end of FIG. 7), in which event the contact portions 43 may be eliminated.

The holes 41 may be of various shapes or have angled or textured walls 45 (the wall 45 of the right most hole 41 of FIG. 7 being shown angled) to cause a portion of the light to be emitted toward the control buttons.

Figure 7A:
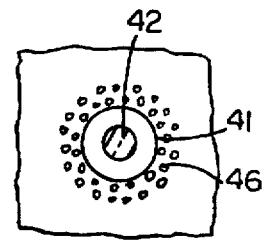
FIG. 7A is a fragmentary top plan view of a portion of the light emitting panel member of FIG. 7 showing light extracting deformities on light emitting surfaces of the panel member around a hole or opening in the panel member in alignment with a control button/key pad.
Figure 7:
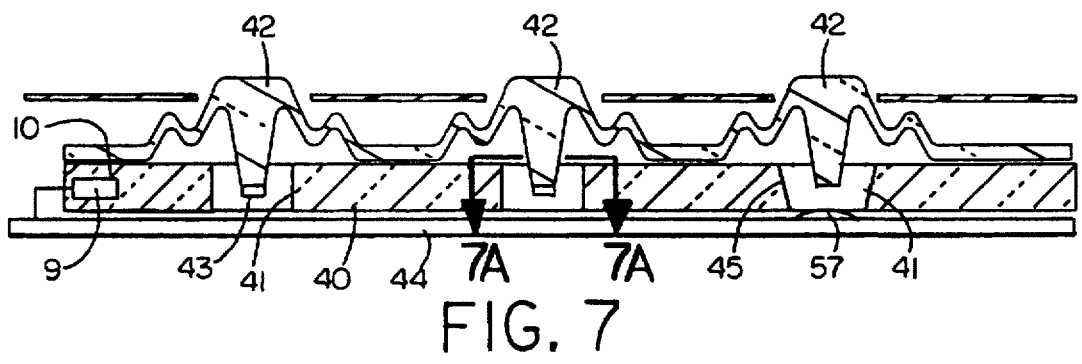
FIG. 7 is a schematic fragmentary section through a portion of a control panel incorporating another form of light emitting panel assembly in accordance with this invention.

In this particular embodiment, light entering the panel member from the light source 9 and associated light transition region 10 will be emitted from the walls 45 of the holes 41 in the panel member to backlight the switches/pads. Also, surface irregularities 46 such as print patterns may be provided around the holes 41 in the panel member as schematically shown in FIG. 7A to cause light to be emitted around the control buttons to flood the area around the control buttons with light. Surface irregularities 46 such as print patterns or molded in shapes may also be provided on other surface areas of the panel member 36, for example, behind the LCD 37 and control buttons 38 for backlighting purposes, etc.

FIG. 8 schematically shows a flush mount application for a light emitting panel assembly 47 in accordance with this invention in which a resiliently deformable elastomeric transparent light emitting panel member 48 is mounted behind a contoured surface such as the dash 49 of a vehicle on which control switches 50 or a logo or the like are mounted. The switches 50 include transparent or translucent key pads 51 or 51' that may be molded into the contoured surface as shown in the center portion of FIG. 8 or molded onto the panel member 48 and extend through openings 49' in the contoured surface as shown to the left and right of center in FIG. 8. Also, the key pads 51, 51' are desirably made of an elastomeric or other flexible material, which together with the panel member 48, provide a soft assembly that absorbs impact to minimize injury to a person thrown against the dash during a traffic accident or the like. Also making the panel member 48 out of a resiliently deformable elastomeric material permits selected areas of the panel member to be pressed into contact/engagement with a printed circuit 52 therebeneath when the key pads are depressed. The printed circuit and panel member may include appropriate circuitry 53, 54 such as conducting ink printed on adjacent surfaces to complete an appropriate circuit when brought into contact with each other. Alternatively dome switches 57 may be provided for engagement by the key pads (one such dome switch being shown toward the right end of FIG. 8) thus eliminating the need for the circuitry 53, 54. Also, the printed circuit 52 may be made of a suitable resiliently deformable elastomeric material or flexible film for contouring and to help in providing a soft assembly to absorb impact during a traffic accident or the like.

FIGS. 9 and 10 schematically illustrate another form of light emitting panel assembly 56 in accordance with this invention for use with dome switches 57 for switch array lighting, keyless entry, radio and/or tape/CD controls or other such applications. In this particular embodiment, a relatively rigid transparent light emitting panel member 58 extends through transverse openings or slots 59 (see FIG. 10) in an array of push buttons 60 in line with the dome switches 57. The ends or other sections of the panel member are supported by a rigid tray 61 containing or in close proximity to a printed circuit 62 on which the dome switches may be mounted. The height of the slots 59 through the push buttons 60 is greater than the thickness of the panel member 58 whereby the push buttons will float on the panel member, thus allowing the push buttons to be pressed into contact with the respective dome switches on the printed circuit to activate appropriate circuitry.

FIGS. 9 and 10 show a single panel member 58 with associated light sources 9 and light transition regions 10 at one or both ends thereof for illuminating single indicator buttons 60, whereas FIG. 11 shows two light emitting panel members 66, 67 with separate light sources 9 and associated light transition regions 10 for illuminating dual indicator buttons 68 for illuminating radio controls and/or tape/CD controls or the like. Surface irregularities such as print patterns or molded in shapes may be provided on selected surface areas of the panel members within and/or around the push buttons to cause light to illuminate the buttons.

Figure 14:
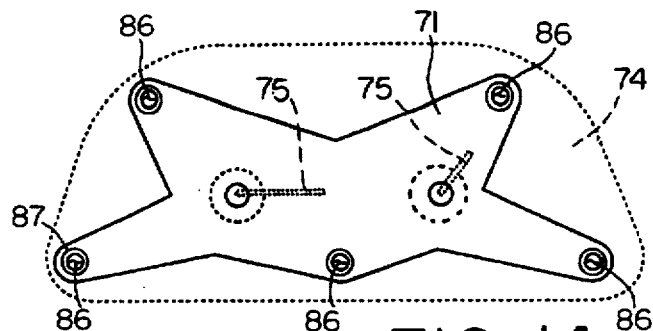
FIG. 14 is a top plan view of one light emitting panel assembly in accordance with this invention incorporated in the instrument panel of FIG. 12 as seen from the plane of the line 14—14 thereof.

FIGS. 12 through 15 schematically illustrate another form of light emitting panel assembly 70 in accordance with this invention including two or more stacked relatively rigid transparent light emitting panel members 71, 72 in a multilayer instrument panel 73. The outer (i.e. upper) panel member 71, shown in plan view in FIG. 14, provides a structural support for a graphic overlay 74, shown in plan view in FIG. 13. Pointers 75 are supported outwardly of the graphic overlay 74 by shafts 76 (see FIG. 12) which extend through the panel members and are rotatably driven by motor controllers 77 inwardly (i.e. below) of the panel members. The pointers may be illuminated as by providing prismatic surfaces 78 and/or surface irregularities around openings 79 in the outer panel member 71 through which the shafts 76 extend for reflecting/refracting light within the outer panel member into the pointers 75. The pointers 75 may also be made of a light transmitting material, with prismatic surfaces 80 at one end of the pointers to cause light received from the outer panel member to be reflected/ refracted back through the pointers and emitted through light emitting surface areas on the pointers.

Figure 15:
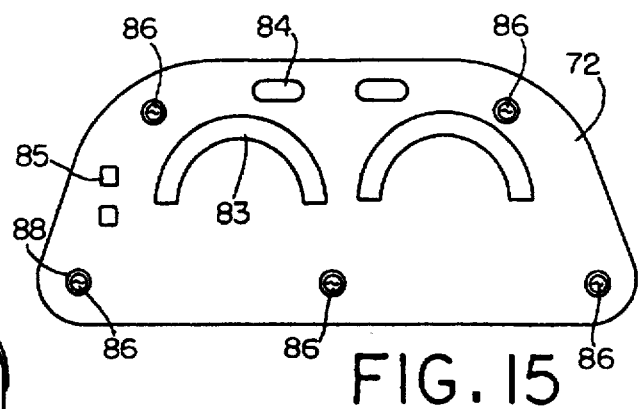
FIG. 15 is a top plan view of another form of light emitting panel assembly in accordance with this invention incorporated in the instrument panel of FIG. 12 as seen from the plane of the line 15—15 thereof.

The inner (i.e. lower) panel member 72, shown in plan view in FIG. 15, includes different shaped light emitting surface areas 83, 84 and 85 for emitting light entering the panel member from one or more light sources for backlighting the graphic overlay 74 mounted on the outer surface of the outer panel member 71.

Separate or common light sources may be provided for each panel member 71, 72 as desired. In the embodiment shown in FIGS. 12 through 15, common light sources 86 for both panel members 71, 72 extend into aligned openings 87, 88 in the panel members. Also, separate indicator lights 89 may be mounted at selected positions on a printed circuit 90 inwardly of both panel members 71, 72 for shining light through both panel members to different indicators 91 on the graphic overlay 74 as schematically shown in FIGS. 12 and 13. Suitable shields/reflectors 92 may be provided around/ between the indicator lights 89 (see FIG. 12) to shield the light and direct it to the appropriate indicators.

Figure 16:
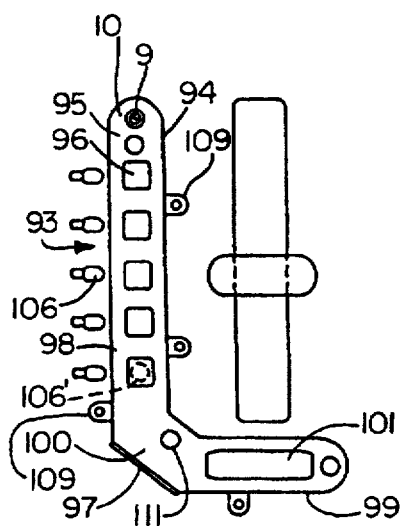
FIGS. 16 through 18 are schematic plan views showing other forms of light emitting panel assemblies in accordance with this invention which provide a structural support for graphic overlays/decals used for example to designate the various gear shift lever positions of an engine.

FIG. 16 shows another form of light emitting panel assembly 93 in accordance with this invention including a rigid transparent light emitting panel member 94 which may act as a structural support for a graphic overlay/decal 95 used, for example, to designate the various gear shift lever positions for the engine of a vehicle. One or more light sources 9 may be inserted/embedded within light transition regions 10 on the panel member to provide backlighting at selected surface areas 96 along the length of the panel member corresponding for example to the different gear shift selector positions (viz. P R N D L) or to provide accent lighting or backlighting for a logo. The panel member 94 shown in FIG. 16 is generally L shaped, with an angled reflective surface 97 interconnecting the legs 98, 99 of the panel member for reflecting a portion of the light from the light source 9 on one of the legs 98 of the panel member around a corner 100 for providing backlighting at one or more selected areas 101 on the other leg 99 of the panel member.

Figure 17:
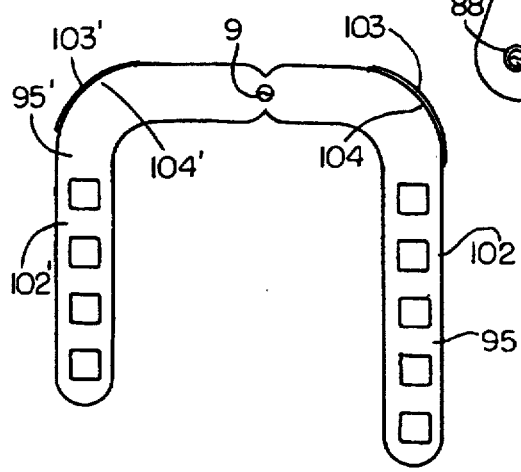

Instead of being generally L shaped, the panel member 102 can be curved in one or more planes as schematically shown in FIG. 17. Also, two such panel members 102, 102' may be provided as shown in FIG. 17 for designating the different gear shift lever positions of a four wheel drive vehicle. In this particular embodiment, the two panel members are joined together and a common light source 9 is used to supply light to both panel members, with reflective surfaces 103, 103' at the corners 104, 104' for reflecting/ refracting a portion of the light around the corners.

Figure 18:
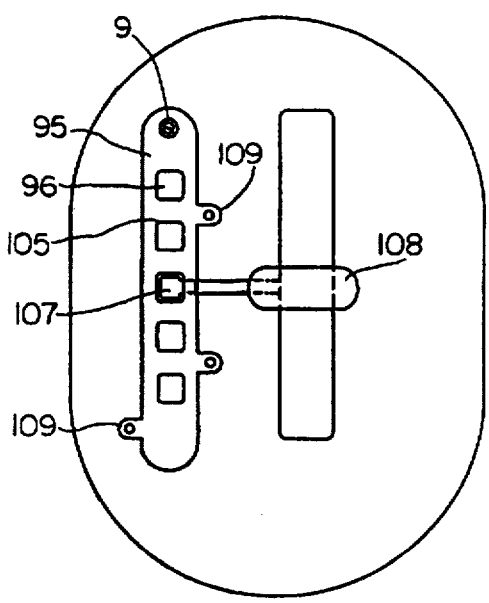

Alternatively, the panel member 105 may be substantially straight as schematically shown in FIG. 18.

A plurality of indicator lights 106 may also be located along an edge of the panel members in line with the light emitting surface areas 96 corresponding to the respective gear shift lever positions as schematically shown in FIG. 16 for providing increased light output at these positions. Also, additional light sources 106' may be placed behind the panel members for shining light through the light emitting surface areas or other surface areas of the panel member as shown in phantom lines in FIG. 16.

A filter 107 may be interposed between the panel members and associated graphic overlay 95 for movement with a gear selector shift lever 108 into overlying relation with any one of the light emitting surface areas 96 on the panel members corresponding to the selected gear shift position as schematically shown in FIG. 18 to provide a different color or shade of light output at the selected gear shift position. For example, the filter 107 may be a red filter that changes the color of the light output at the selected gear shift position from white to red.

Figure 19:
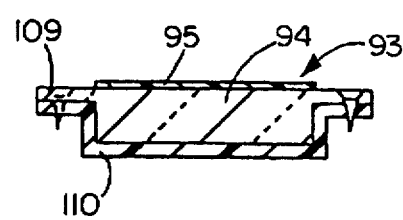
FIG. 19 is a fragmentary transverse section through one such light emitting panel member used as a structural support.

Along both side edges of the panel member are tabs 109 which may be used for example to heat stake the panel member to a back reflector tray 110 for the panel member as schematically shown in FIG. 19. Also, posts 111 may be provided on the panel members for heat staking the overlay/ label 95 to the panel members and/or heat staking the panel members to an interior body panel of the vehicle.

Figure 20:
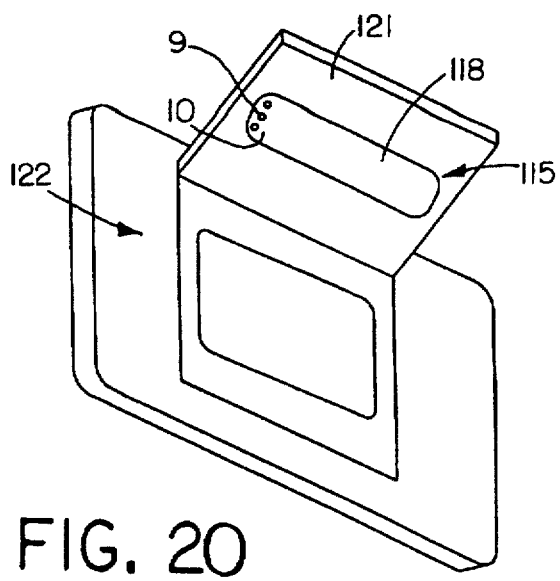
Figure 21:
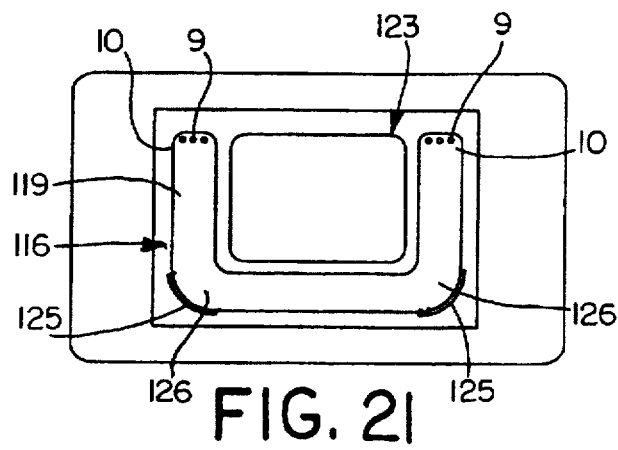
Figure 22:
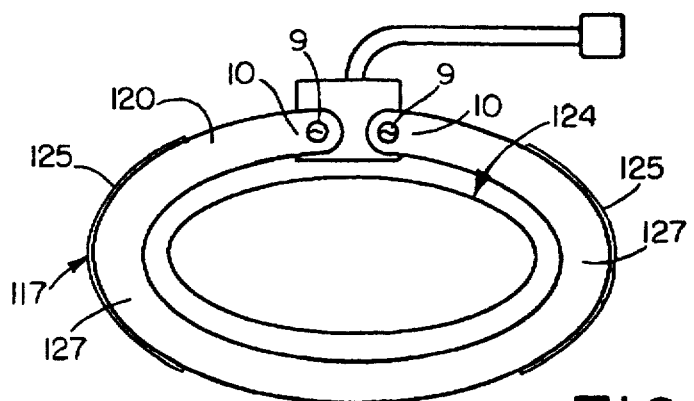

FIGS. 20 through 22 show other forms of light emitting panel assemblies 115, 116 and 117 in accordance with this invention including respective light emitting panel members 118, 119 and 120 mounted on the flap 121 of a vanity mirror 122 (see FIG. 20), extending around three sides of a generally rectangular vanity mirror 123 (see FIG. 21), and extending substantially completely around an elliptical vanity mirror 124 (see FIG. 21). Such panel members 118, 119 and 120 have a relatively thin, low profile, for example less than one quarter inch thick, with one or more light sources 9 and light transition regions 10 at one or both ends of the panel members to produce a uniform diffuse, shadowless light around the vanity mirror. In the FIG. 20 embodiment, where the panel member 118 is shown mounted on the vanity mirror flap 121, the panel member is generally straight and extends substantially the entire length of the mirror in generally parallel relation thereto, with light sources 9 and associated light transition region 10 at one end of the panel member. In the FIG. 21 embodiment, the panel member 116 is generally U shaped and is configured to extend substantially the full length of three sides of the mirror in generally parallel relation and in close proximity thereto, whereas in the FIG. 22 embodiment, the panel member 120 is generally elliptical in shape. In both the FIGS. 21 and 22 embodiments, the panel members 119 and 120 have one or more light sources 9 and associated light transition regions 10 at both ends of the panel members. Also, reflective surfaces 125 are provided at the corners/ curves 126, 127 of the panel members 119, 120 for reflecting a portion of the light around the corners/curves.

Although the invention has been shown and described with respect to certain preferred embodiments, it is obvious that equivalent alterations and modifications will occur to others skilled in the art upon the reading and understanding of the specification. The present invention includes all such equivalent alterations and modifications and is limited only by the scope of the claims.

What is claimed is:

1. A light emitting panel assembly in combination with a body portion of a vehicle, said panel assembly comprising a solid one-piece light emitting panel member made out of a transparent resiliently deformable material that allows flexing of said panel member without breakage, said panel member having a relatively low profile including a greater cross sectional width than thickness and including top and bottom surfaces, and a light transition region for receiving light from a light source and directing such light through said panel member and emission out through a light emitting surface on one of said top and bottom surfaces, said panel member being mounted on said body portion with said light emitting surface facing outwardly for emission of light out through said light emitting surface from a light source associated with said light transition region, said panel member being located on an exterior surface of said body portion so as to provide a running light on said vehicle.

2. The assembly of claim 1 further comprising a light source embedded, potted or bonded within said light transition region.

3. The assembly of claim 1 further comprising a fiber optic light pipe for transmitting light to said light transition region from a remote light source.

4. The combination of claim 1 further comprising a lens or film covering said light emitting surface of said panel member.

5. A light emitting panel assembly in combination with a body portion of a vehicle, said panel assembly comprising a solid one-piece light emitting panel member made out of a transparent resiliently deformable material that allows flexing of said panel member without breakage, said panel member having a relatively low profile including a greater cross sectional width than thickness and including top and bottom surfaces, and a light transition region for receiving light from a light source and directing such light through said panel member and emission out through a light emitting surface on one of said top and bottom surfaces, said panel member being mounted on said body portion with said light emitting surface facing outwardly for emission of light out through said light emitting surface from a light source associated with said light transition region, said panel member being mounted at an exterior corner of said vehicle with said light emitting surface facing outwardly to provide illumination adjacent said corner, and said light transition region and said associated light source being located inwardly of an outermost edge of said corner to minimize the risk of damage to said light source in the event said outermost edge is impacted during a minor traffic accident.

6. The combination of claim 5 wherein said light emitting surface of said panel member wraps around said corner to provide illumination around said corner.

7. The combination of claim 5 wherein said panel member is at a rear corner of said vehicle to provide a running taillight for said vehicle.

8. The combination of claim 5 wherein a plurality of light sources associated with said light transition region are located inwardly of said outermost edge of said corner to minimize the risk of damage to any of said light sources in the event said outermost edge is impacted during a minor traffic accident.

9. The combination of claim 5 further comprising an other light source located directly behind said panel member for shining light through said panel member independently of the light emitted by said panel member from said light source associated with said light transition region.

10. The combination of claim 9 wherein said other light source provides greater illumination through said panel member than the light emitted by said panel member from said light source because of the greater light concentration effect of said other light source shining directly through said panel member.

11. The combination of claim 10 wherein said other light source comprises one or more light emitting diodes, incandescent or halogen lamps located directly behind said panel member.

12. The combination of claim 10 wherein said other light source produces sufficient illumination through said panel member to provide a brake light, turn signal light, or turning or backup light for said vehicle.

13. The combination of claim 9 further comprising a trans reflector on said panel member through which a portion of the light from said other light source passes.

14. The combination of claim 9 further comprising a hole through said panel member in line with said other light source to provide unobstructed passage of light from said other light source through said hole in said panel member.

15. A light emitting panel assembly in combination with a body portion of a vehicle, said panel assembly comprising a solid one-piece light emitting panel member made out of a transparent resiliently deformable material that allows flexing of said panel member without breakage, said panel member having a relatively low profile including a greater cross sectional width than thickness and including top and bottom surfaces, and a light transition region for receiving light from a light source and directing such light through said panel member and emission out through a light emitting surface on one of said top and bottom surfaces, said panel member being mounted on said body portion with said light emitting surface facing outwardly for emission of light out through said light emitting surface from a light source associated with said light transition region, said body portion comprising a trunk lid of a vehicle.

16. A light emitting panel assembly in combination with a body portion of a vehicle, said panel assembly comprising a solid one-piece light emitting panel member made out of a transparent resiliently deformable material that allows flexing of said panel member without breakage, said panel member having a relatively low profile including a greater cross sectional width than thickness and including top and bottom surfaces, and a light transition region for receiving light from a light source and directing such light through said panel member and emission out through a light emitting surface on one of said top and bottom surfaces, said panel member being mounted on said body portion with said light emitting surface facing outwardly for emission of light out through said light emitting surface from a light source associated with said light transition region, said panel member forming an exterior surface of said body portion.

* * * * *